(No Model.) 7 Sheets—Sheet 1.
L. K. JOHNSON & A. A. LOW.
TYPE SETTING APPARATUS.
No. 539,949. Patented May 28, 1895.
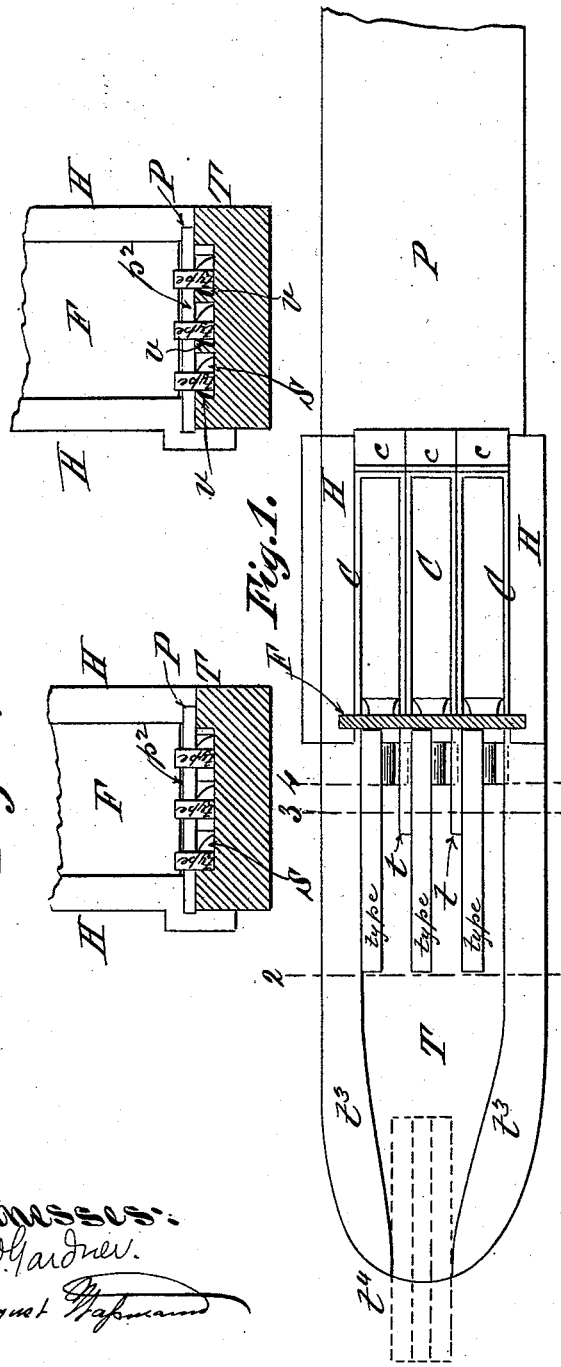

(No Model.) 7 Sheets—Sheet 2.
L. K. JOHNSON & A. A. LOW.
TYPE SETTING APPARATUS.
No. 539,949. Patented May 28, 1895.
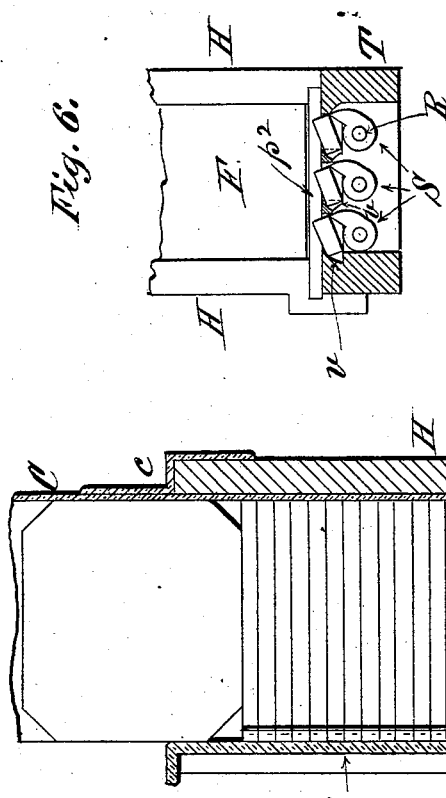
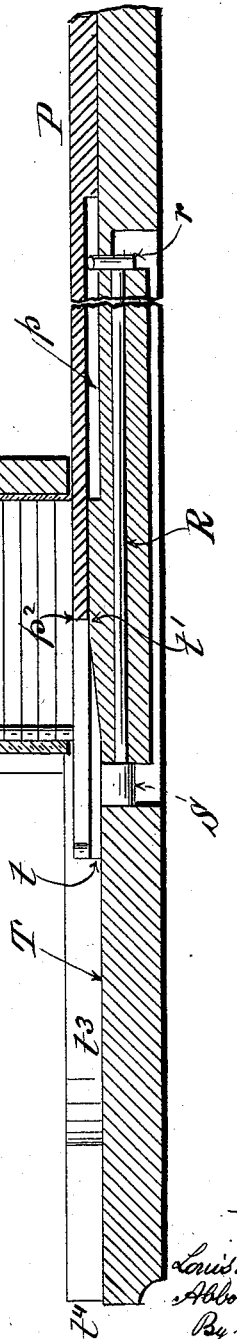

(No Model.) 7 Sheets—Sheet 3.

L. K. JOHNSON & A. A. LOW.
TYPE SETTING APPARATUS.

No. 539,949. Patented May 28, 1895.

Witnesses:
D. W. Gardner
August Hofmann

Inventors:
Louis Kossuth Johnson
Abbot Augustus Low
By their Attorney
George William Miatt (No Model.) 7 Sheets—Sheet 4.
L. K. JOHNSON & A. A. LOW.
TYPE SETTING APPARATUS.
No. 539,949. Patented May 28, 1895.
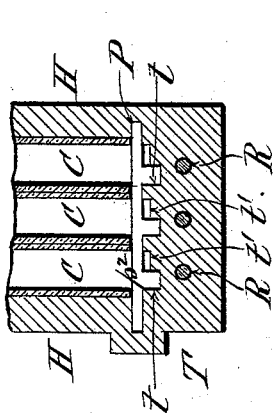
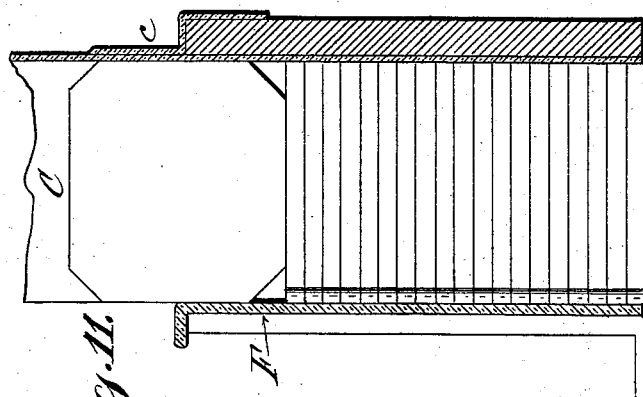
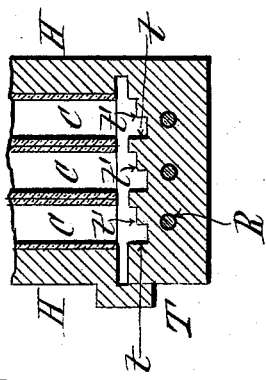

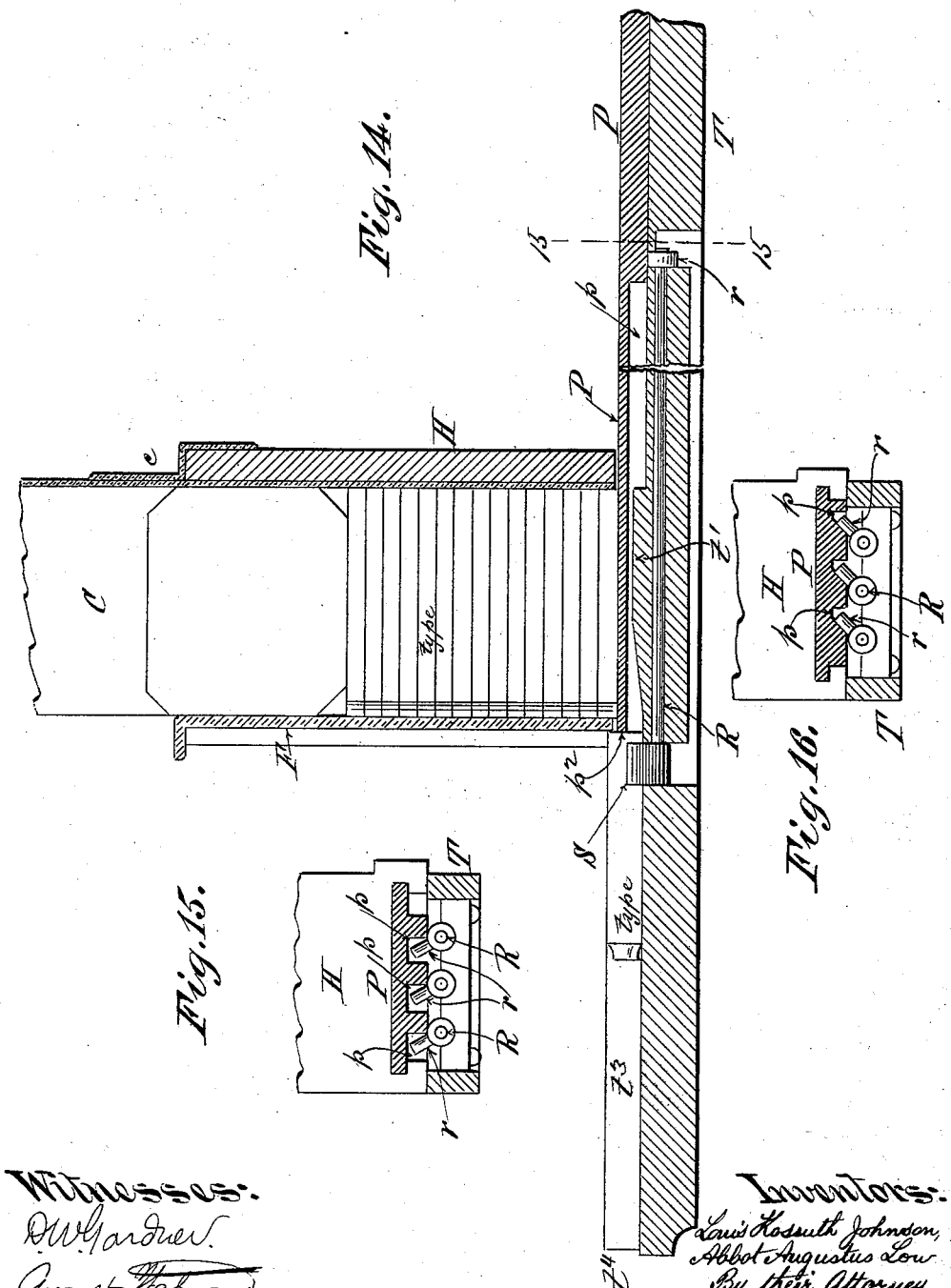

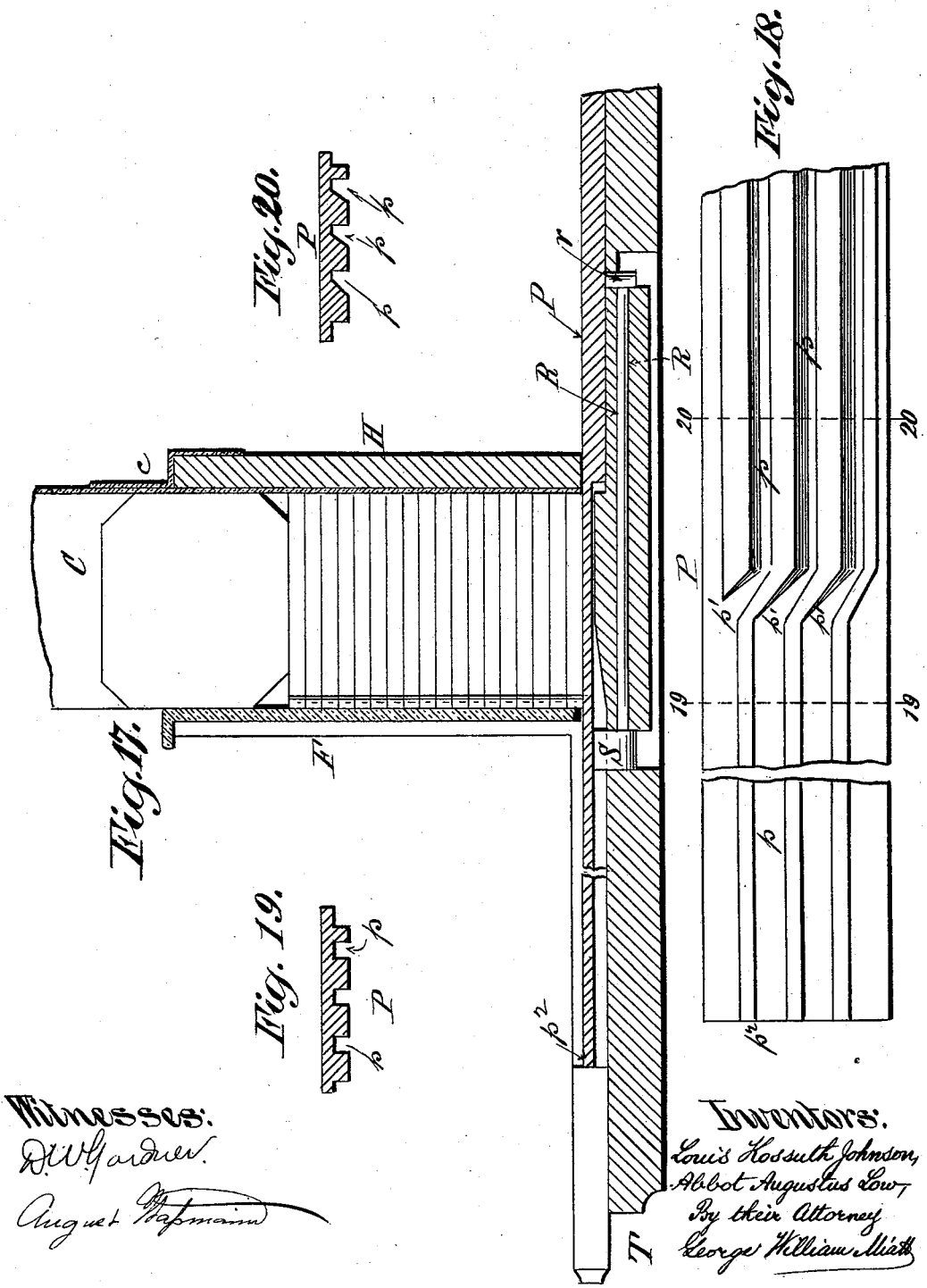

(No Model.)  7 Sheets—Sheet 7.
L. K. JOHNSON & A. A. LOW.
TYPE SETTING APPARATUS.
No. 539,949.   Patented May 28, 1895.
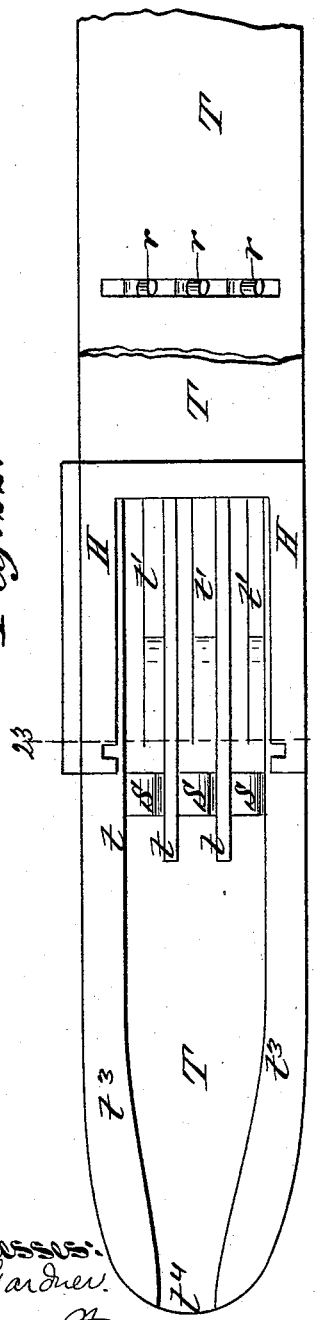
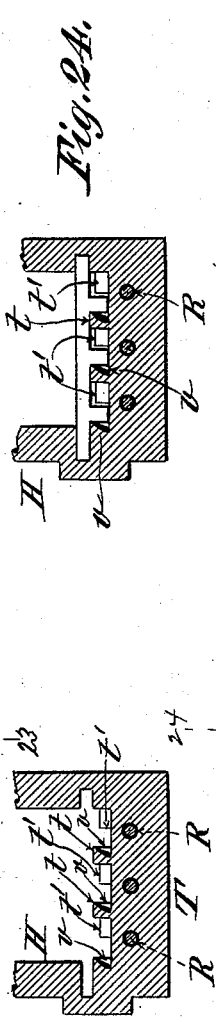
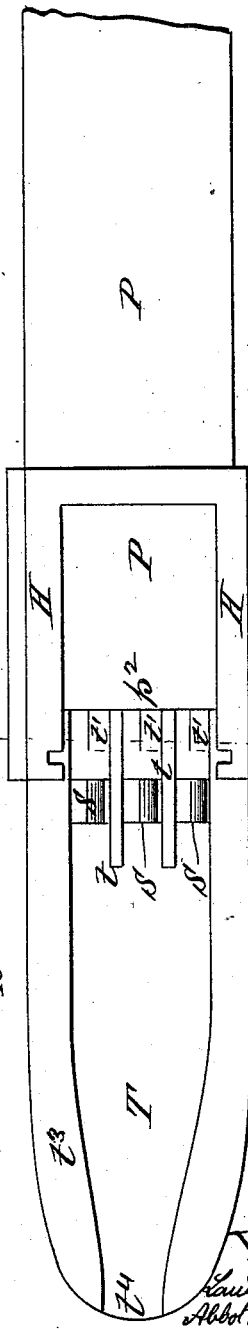
Witnesses:
D. W. Gardner.
August Hafmand
Inventors:
Louis Kossuth Johnson,
Abbot Augustus Low,
By their Attorney
George William Miatt
THE NORRIS PETERS CO., PHOTO-LITHO., WASHINGTON, D. C.

UNITED STATES PATENT OFFICE.

LOUIS KOSSUTH JOHNSON AND ABBOT AUGUSTUS LOW, OF BROOKLYN, ASSIGNORS TO THE ALDEN TYPE MACHINE COMPANY, OF NEW YORK, N. Y.

TYPE-SETTING APPARATUS.

SPECIFICATION forming part of Letters Patent No. 539,949, dated May 28, 1895.

Application filed December 6, 1894. Serial No. 530,982. (No model.)

*To all whom it may concern:*

Be it known that we, LOUIS KOSSUTH JOHNSON and ABBOT AUGUSTUS LOW, citizens of the United States, residing in the city of Brooklyn, in the county of Kings and State of New York, have invented certain new and useful Improvements in Type-Setting Apparatus, of which the following is a specification sufficient to enable others skilled in the art to which the invention appertains to make and use the same.

Our improvements relate to type setting apparatus in which the types resting on their flat sides in the containing channels, are turned upon their edges during the operation of forwarding them from the channels into position to be grasped between the fingers of the compositor. We have heretofore accomplished this result in various ways, as by allowing the types to drop on their edges, passing them through quarter turn grooves, &c.

Our present invention consists essentially in raising the types from their flat sides to their edges by means of pivoted turning fingers which act in conjunction with opposed stationary shoulders on the type platform in such manner that the types make a quarter turn on their longitudinal axes. The invention also includes certain special features in the construction and arrangement of the parts, whereby the pusher actuates the pivotal-raising fingers, &c., as hereinafter fully described and claimed.

Figure 8:
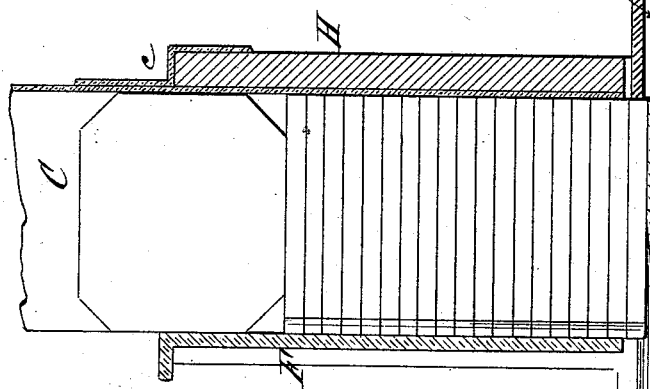
Figure 9:
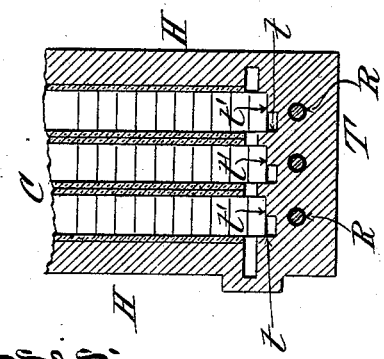
Figure 10:

In the accompanying drawings, Figure 1 is a top view of our device, the upper end of the face-plate being shown in section; Fig. 2, a transverse vertical section upon plane of line 2 2, Fig. 1; Fig. 3, a similar view on plane of line 3 3, Fig. 1; Figs. 4 and 5, transverse sections upon plane of line 4 4, Fig. 1, showing the pivoted type-raising fingers first in the raised and then in the lowered position; Fig. 6, a similar view showing the pivoted type-raising fingers in an intermediate position and in the act of turning the types; Fig. 7, a vertical longitudinal section showing the type partially forwarded; Fig. 8, a similar view showing the type forwarded into position for removal by hand and the type-forwarder retracted to its normal position. Fig. 9 is a transverse section through the lower part of the channel-holder, channels, and platform. Fig. 10 is a plan of the pusher. Fig. 11 is a longitudinal section, the type having been removed and the type-pusher having just started to advance to forward more types. Figs. 12 and 13 are transverse sectional views through the lower part of the channel-holder and adjoining parts without and with the pusher, respectively. Fig. 14 is a vertical longitudinal section showing the parts just after the raising of the types; Figs. 15 and 16, respectively, sectional views upon plane of line 15 15, Fig. 14, illustrating the method of rocking the pivoted type-turning fingers. Fig. 17 is a longitudinal section showing the type fully projected by the type-pusher. Fig. 18 is a view of the under side of the pusher; Fig. 19, a transverse section thereof on plane of line 19 19, Fig. 18; Fig. 20, a similar view on plane of line 20 20, Fig. 18. Fig. 21 is a plan, the type-containing channels being removed; Fig. 22, a similar view with the type-pusher withdrawn also; Fig. 23, a transverse section upon plane of line 23 23, Fig. 22; Fig. 24, a similar view upon plane of line 24 24 on Fig. 21.

The type containing channels C C, are supported in a holder H, in any of the ways heretofore described by us, as by the hangers *c, c*, shown in the drawings. The holder H, is supported above or upon the type platform T, in such manner as to allow the pusher P, to reciprocate between it and the said type platform.

Coinciding with the side walls of the type containing channels C, C, are ribs or shoulders *t, t*, formed upon the upper surface of the platform T which project beyond the front plate F, of the holder. The lowest type in each column rests between these ribs *t, t*, until forwarded beyond them, which however does not occur until the types have been lifted or turned upon their edges by the pivoted turning fingers S, which raise the edges of the types upon one side while their edges on the other side bear against the opposed surfaces of the shoulders *t, t*, which thus act as guides and sustainers.

The turning fingers S, S, are mounted on the forward ends of the rock shafts R, R, which extend underneath the platform T, beyond the rear of the holder H, where they are formed with radial arms $r, r$, which project upward through the floor and engage with the grooves $p, p$, formed in the under side of the pusher P. These grooves $p, p$, are formed with off-sets $p', p'$, properly located and turned to rock the arms $r, r$, and through them the shafts R, R, and turning fingers S, as soon as the types have been forwarded sufficiently to be free to turn upon their longitudinal axes. During the retractile movement of the pusher these off-sets $p', p'$, rock the arms $r, r$, shafts R, R, and turning fingers S, S, back into their normal positions, with the turning fingers S, S, below the surface of the type platform T.

The types rest upon steps $t, t$, below the type containing channels C, C, which steps gradually merge into the surface of the type platform. By this means the forward edge $p^2$, of the pusher selects the lowest types without disturbing those next above, and can ride over the turning shoulders $t, t$, and the turning fingers S.

The turning shoulders $t, t$, are hollowed out on the sides adjoining the pivoted turning fingers, as indicated clearly in Figs. 4, 5 and 6, to allow the said fingers free play; and the sides of the shoulders opposed to the lifting fingers are made concave ($v$) beyond the holder H, to receive and guide the adjoining edges of the types during the operation of turning them as illustrated in Fig. 6. After turning the types the fingers sustain them laterally on their edges until they are about to pass under the control of the converging side walls $t^3, t^3$, by which they are guided to the port $t^4$.

What we claim as our invention, and desire to secure by Letters Patent, is—

1. In a type case, the combination of a type containing channel supported independently, a type platform, a type forwarder, and a pivotal finger for turning the types upon their longitudinal axes, substantially in the manner and for the purpose described.

2. In a type case, the combination of a plurality of type containing channels supported independently a type platform, a type forwarder, and a series of pivotal fingers for turning the type upon their longitudinal axes substantially in the manner and for the purpose described.

3. In a type case, the combination with the type containing channels, and type platform, of the pivotally supported type-turning fingers, rock shafts and lateral extensions, and the type forwarder formed with surfaces for controlling and operating the turning fingers substantially in the manner and for the purpose described.

4. In a type case, the combination of type containing channels independently supported, a type platform a type forwarder, type-turning fingers and type turning shoulders acting in conjunction therewith, substantially in the manner and for the purpose described.

5. In a type case, the combination of type containing channels independently supported, a type platform, a type forwarder, type turning fingers, and type turning shoulders formed with concave surfaces substantially in the manner and for the purpose described.

LOUIS KOSSUTH JOHNSON.
ABBOT AUGUSTUS LOW.

Witnesses:
GEORGE WILLIAM MIATT,
D. W. GARDNER.